United States Patent
Peng et al.

(10) Patent No.: US 9,309,130 B2
(45) Date of Patent: Apr. 12, 2016

(54) INTEGRATED PROCESS FOR THE PRODUCTION OF HYDROGEN AND WATER

(71) Applicant: AIR PRODUCTS AND CHEMICALS INC., Allentown, PA (US)

(72) Inventors: Xiang-Dong Peng, Orefield, PA (US); Derek Miller, Emmaus, PA (US); Geoffrey Colling Achilles, Allentown, PA (US); Xianming Jimmy Li, Orefield, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 0 days.

(21) Appl. No.: 14/061,428

(22) Filed: Oct. 23, 2013

(65) Prior Publication Data

US 2015/0110708 A1    Apr. 23, 2015

(51) Int. Cl.

| | |
|---|---|
| C01B 3/26 | (2006.01) |
| C02F 1/06 | (2006.01) |
| C02F 1/16 | (2006.01) |
| C01B 3/38 | (2006.01) |
| C01B 3/48 | (2006.01) |
| C02F 1/04 | (2006.01) |
| B01D 1/00 | (2006.01) |
| B01D 3/06 | (2006.01) |
| C02F 103/00 | (2006.01) |
| C02F 103/08 | (2006.01) |

(52) U.S. Cl.
CPC ................ *C02F 1/06* (2013.01); *B01D 1/0058* (2013.01); *B01D 3/065* (2013.01); *C01B 3/384* (2013.01); *C01B 3/48* (2013.01); *C02F 1/048* (2013.01); *C02F 1/16* (2013.01); *C01B 3/26* (2013.01); *C01B 2203/0233* (2013.01); *C01B 2203/0288* (2013.01); *C01B 2203/043* (2013.01); *C01B 2203/0811* (2013.01); *C01B 2203/0883* (2013.01); *C01B 2203/1235* (2013.01); *C01B 2203/1241* (2013.01); *C01B 2203/1247* (2013.01); *C01B 2203/1258* (2013.01); *C02F 2103/007* (2013.01); *C02F 2103/08* (2013.01); *Y02P 20/129* (2015.11)

(58) Field of Classification Search
CPC ................ C01B 3/26; C02F 1/16; C02F 1/06
USPC ........................................................ 423/652
See application file for complete search history.

(56) References Cited

U.S. PATENT DOCUMENTS

| | | |
|---|---|---|
| 3,399,118 A | 8/1968 | Williamson |
| 3,412,558 A | 11/1968 | Starmer |
| 3,441,393 A | 4/1969 | Finneran et al. |

(Continued)

FOREIGN PATENT DOCUMENTS

| | | |
|---|---|---|
| CA | 2190299 | 11/1996 |
| DE | 102 16 709 B4 | 4/2003 |

(Continued)

*Primary Examiner* — Paul Wartalowicz
(74) *Attorney, Agent, or Firm* — Bryan C. Hoke, Jr.

(57) ABSTRACT

Process for producing a hydrogen-containing product and one or more liquid water products using catalytic steam-hydrocarbon reforming. In the process, a portion of the make-up water is heated by the reformate and another portion of the make-up water is heated by the combustion product gas prior to introducing the make-up water to a deaerator. Water in the combustion product gas is condensed to form a liquid water product. The process may be integrated with a thermal water desalination process.

19 Claims, 8 Drawing Sheets

(56) References Cited

U.S. PATENT DOCUMENTS

| | | |
|---|---|---|
| 3,479,820 A | 11/1969 | Rutenberg |
| 3,597,328 A | 8/1971 | Michels |
| 3,691,020 A | 9/1972 | Hughes |
| 3,875,017 A | 4/1975 | Saari et al. |
| 4,338,199 A | 7/1982 | Modell |
| 5,421,962 A | 6/1995 | Shvarts et al. |
| 5,441,548 A | 8/1995 | Brandl et al. |
| 6,077,323 A * | 6/2000 | Nataraj et al. ............... 48/198.1 |
| 7,037,485 B1 | 5/2006 | Drnevich et al. |
| 7,377,951 B2 | 5/2008 | Pham et al. |
| 7,427,368 B2 | 9/2008 | Drnevich |
| 7,988,948 B2 | 8/2011 | Guvelioglu |
| 8,387,545 B2 | 3/2013 | Latimer et al. |
| 8,430,947 B2 | 4/2013 | Latimer et al. |
| 8,496,908 B1 | 7/2013 | Genkin et al. |
| 2002/0006969 A1 * | 1/2002 | O'Beck et al. ................ 518/704 |
| 2002/0025987 A1 | 2/2002 | Iijima et al. |
| 2003/0130360 A1 * | 7/2003 | Kindig et al. ................ 518/703 |
| 2004/0038089 A1 | 2/2004 | Hoffjann et al. |
| 2007/0006565 A1 * | 1/2007 | Fleischer et al. ............. 60/39.5 |
| 2007/0041894 A1 * | 2/2007 | Drnevich ...................... 423/650 |
| 2007/0246345 A1 | 10/2007 | Leveson et al. |
| 2009/0117024 A1 | 5/2009 | Weedon et al. |
| 2009/0230359 A1 | 9/2009 | Guvelioglu et al. |
| 2009/0232729 A1 | 9/2009 | Genkin et al. |
| 2010/0015039 A1 | 1/2010 | Doshi et al. |
| 2011/0005392 A1 * | 1/2011 | Pirngruber et al. ............. 95/103 |
| 2011/0147195 A1 | 6/2011 | Shapiro et al. |
| 2011/0162952 A1 | 7/2011 | Conchieri et al. |
| 2012/0055776 A1 | 3/2012 | Feher |
| 2013/0097929 A1 | 4/2013 | Pham et al. |
| 2013/0282145 A1 | 10/2013 | Yeryomenko et al. |

FOREIGN PATENT DOCUMENTS

| | | |
|---|---|---|
| EP | 0142214 | 5/1985 |
| EP | 0200825 A1 | 12/1986 |
| EP | 1921281 | 10/2007 |
| GB | 754745 | 8/1956 |
| GB | 2443802 | 5/2008 |
| GB | 2470874 A | 12/2010 |
| WO | 2004103896 | 12/2004 |
| WO | 2007149879 A2 | 12/2007 |

* cited by examiner

INTEGRATED PROCESS FOR THE PRODUCTION OF HYDROGEN AND WATER

CROSS-REFERENCE TO RELATED APPLICATIONS

This patent application is related to U.S. patent application Ser. No. 14/061,377, titled "Hydrogen Production Process with High Export Steam", filed contemporaneously with the present application.

BACKGROUND

The catalytic steam-hydrocarbon reforming process is a large consumer of water. Roughly 5 kg of water is consumed for every kg of hydrogen produced. Efficient use of water is particularly important in regions where water is scarce.

Industry desires to reduce the amount of water imported (i.e. make-up water) by the catalytic steam-hydrocarbon reforming process, particularly in regions where water is scarce.

Industry further desires to reduce or eliminate water treatment cost in a catalytic steam-hydrocarbon reforming plant. Currently, make-up water needs to be treated in a catalytic steam-hydrocarbon reforming plant so that it meets the requirements for the boiler feed water. These treatments include filtration to remove particulates, demineralization to remove minerals, and deaeration to remove soluble gases such as $O_2$ and $CO_2$.

BRIEF SUMMARY

The present invention relates to a process for producing a $H_2$-containing product and one or more liquid water products and aims to satisfy the above-stated desires of industry. The $H_2$-containing product is produced using a catalytic steam-hydrocarbon reforming process.

The catalytic steam-hydrocarbon reforming process combusts a large amount of hydrocarbon fuel to provide heat for the reforming reactions. The combustion product gas (flue gas) contains water vapor as a combustion product. The amount of water in the combustion product gas may be about 60% to about 90% of the total water reacted in the reforming reactions. Recovering water from the combustion product gas can significantly reduce the external water demand of the catalytic steam-hydrocarbon reforming process.

Recovering water from the combustion product gas has not been done in the conventional steam-hydrocarbon reforming process because it is costly. Before the water in the combustion product gas can be condensed, a large amount of low level sensible heat needs to be removed from the combustion product gas. Conventionally, this heat is rejected to the atmosphere. Therefore, not only does the water recovery need to cover the cost associated with the equipment and cooling utility for condensing the water, but also the cost associated with the equipment and cooling utility for rejecting the sensible heat, making the water recovery using earlier reformer designs commercially infeasible.

Industry needs cost-effective ways to recover water from the combustion product gas. The present invention helps to achieve this goal by eliminating or reducing the cost associated with rejecting the low level sensible heat from the combustion product gas to the atmosphere.

Low level sensible heat is extracted from the combustion product gas (flue gas) and from the reformate to heat make-up water prior to introducing the make-up water into a deaerator. The combustion product gas is further cooled in a condenser to condense water out of the combustion product gas thereby forming at least a portion of the one or more liquid water products.

Extracting the low level sensible heat from the combustion product gas to heat make-up water enables elimination or reduction in the amount of the sensible heat that needs to be rejected to the atmosphere before the water can be condensed out of the combustion product gas, thereby, reducing the cost of the water recovery. The working mechanism depends on the amount of export steam the hydrogen production process produces.

When high export steam production is desired, the sensible heat transferred to the make-up water is recycled back to the hydrogen production process to improve its thermal efficiency. This part of the sensible heat removal from the combustion product gas realizes its value in improving hydrogen production efficiency, therefore, does not contribute to the cost of water recovery from the combustion product gas, making the water recovery more cost effective.

When medium or low export steam production is desired, heating the make-up water using the combustion product gas essentially shifts the low level sensible heat in the combustion product gas to the reformate. The low level heat in the reformate is then used as the heat source for a thermal water purification process such as multiple effect distillation process or multiple stage flash process to produce purified water. This part of the sensible heat removal from the combustion product gas realizes its value in producing the purified water, therefore, does not contribute to the cost of water recovery from the combustion gas, making the water recovery more cost effective.

In low export steam production, additional sensible heat from the combustion product gas is used as the heat source in a thermal water purification process to produce purified water. This additional part of the sensible heat removal realizes its value from producing the purified water, therefore, does not contribute to the cost of water recovery from the combustion product gas, make the water recovery more cost effective.

In some embodiments, the present invention integrates a catalytic steam-hydrocarbon reforming process with a thermal water purification process such as multiple effect distillation process or multiple stage flash process by using the low level heat in the reformate and the additional sensible heat in the combustion product gas in the thermal water purification process.

This optional integration provides a low cost energy source for thermal water purification. This integration also provides a new heat sink (i.e. the heat for thermal water purification) and a high purity water source to the catalytic steam-hydrocarbon reforming process. The present invention uses this new heat sink and the high purity water source to reconfigure the reformate heat recovery system, and simplify the water treatment system of the catalytic steam-hydrocarbon reforming process, thereby fulfilling the above-mentioned industrial needs.

There are several aspects of the process as outlined below. In the following, specific aspects of process will be outlined. The reference numbers and expressions set in parentheses are referring to example embodiments explained further below with reference to the figures and are provided for the convenience of the reader. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process comprising:
(a) introducing a reformer feed gas mixture (15) into a plurality of catalyst-containing reformer tubes (20) in a reformer furnace (10), reacting the reformer feed gas mixture (15) in a reforming reaction under reaction conditions effective to form a reformate (25) comprising $H_2$, CO, $CH_4$, and $H_2O$, and withdrawing the reformate (25) from the plurality of catalyst-containing tubes (20);
(b) combusting a fuel (5) with an oxidant gas (3) in a combustion section (30) of the reformer furnace (10) external to the plurality of catalyst-containing reformer tubes (20) under conditions effective to combust the fuel (5) to form a combustion product gas (35) and generate heat to supply energy for reacting the reformer feed gas mixture (15) inside the plurality of catalyst-containing reformer tubes (20), and withdrawing the combustion product gas (35) from the combustion section (30);
(c) heating a first water feed stream (87) by indirect heat transfer with the combustion product gas (35) thereby cooling the combustion product gas (35);
(d) heating a second water feed stream (85) by indirect heat transfer with the reformate (25) withdrawn from the plurality of catalyst-containing tubes (20), thereby cooling the reformate (25);
(e) passing the first water feed stream (87) and the second water feed stream (85) to a deaerator (110), the first water feed stream being passed to the deaerator (110) after being heated by the combustion product gas (35), the second water feed stream being passed to the deaerator (110) after being heated by the reformate (25), stripping dissolved gases from the first water feed stream (87) and from the second water feed stream (85) in the deaerator (110), withdrawing a vent stream (17) from the deaerator (110), the vent stream (17) comprising steam and gases formed from the dissolved gases stripped from the first water feed stream (87) and from the second water feed stream (85), and withdrawing a boiler feed water stream (123) from the deaerator (110), the boiler feed water stream (123) comprising at least a portion of the first water feed stream (87) and at least a portion of the second water feed stream (85);
(f) introducing the combustion product gas (35) into a condenser (9) after the combustion product gas has been cooled by the first water feed stream (87), cooling the combustion product gas in the condenser by indirect heat transfer with a cooling fluid thereby condensing water from the combustion product gas to form a liquid water stream (8), separating the liquid water stream (8) from a water-depleted combustion product gas stream (14), withdrawing the liquid water stream (8) from the condenser, and withdrawing the water-depleted combustion product gas stream (14) from the condenser (9); and
(g) forming the hydrogen-containing product (105) from the reformate (25) after the reformate (25) has heated the second water feed stream (85);
(h) wherein the one or more liquid water products comprise the liquid water stream (8) withdrawn from the condenser (9).

Aspect 2. The process of aspect 1 wherein the first water feed stream (87) is heated by the combustion product gas (35) in step (c) to a temperature ranging from 65° C. to 125° C.

Aspect 3. The process of aspect 1 or aspect 2 wherein the combustion product gas (35) is cooled to a temperature ranging from 50° C. to 85° C. as a result of heating the first water feed stream (87).

Aspect 4. The process of any one of aspects 1 to 3 wherein the second water feed stream (85) is heated by the reformate (25) in step (d) to a temperature ranging from 65° C. to 125° C.

Aspect 5. The process of any one of aspects 1 to 4 wherein the reformate (25) is cooled to a temperature ranging from 25° C. to 150° C. as a result of heating the second water feed stream (85).

Aspect 6. The process of any one of aspects 1 to 5 wherein at least one of the first water feed stream (87) and the second water feed stream (85) comprises at least a portion of the liquid water stream (8). The liquid water (8) from the combustion product gas may be used as make-up water within the reforming process.

Aspect 7. The process of any one of aspects 1 to 6 wherein the reformate (25) is separated into a second liquid water stream (97) and a water-depleted reformate portion (95) after the reformate was cooled by the second water feed stream (85), wherein the one or more liquid water products further comprise the second liquid water stream (97).

Aspect 8. The process of aspect 7 wherein at least one of the first water feed stream (87) and the second water feed stream (85) comprises at least a portion of the second liquid water stream (97).

Aspect 9. The process of any one of aspects 1 to 8 wherein the step of forming the hydrogen-containing product (105) comprises separating at least a portion of the reformate by pressure swing adsorption to produce the hydrogen-containing product (105) and a by-product gas (115).

Aspect 10. The process of aspect 9 wherein the fuel (5) comprises the by-product gas (115) and a supplemental fuel (118; 119).

Aspect 11. The process of aspect 10 further comprising introducing a hydrocarbon feedstock (75; 117) into a hydrodesulphurization unit (300; 310) to remove sulfur from the hydrocarbon feedstock, and forming the supplemental fuel (118; 119) from at least a portion of the hydrocarbon feedstock obtained from the hydrodesulphurization unit.

Aspect 12. The process of any one of aspects 1 to 11 further comprising:
heating raw water (53) by indirect heat transfer with the reformate (25) from step (a) thereby heating the raw water for purification thereof by a thermal water purification process to produce purified water (42), and thereby cooling the reformate (25), wherein the reformate (25) is cooled to heat the raw water (53) before or after the reformate (25) is cooled to heat the second water feed stream (85);
wherein the one or more liquid water products further comprise the purified water (42).

Aspect 13. The process of aspect 12 wherein the step of heating raw water (53) by indirect heat transfer with the reformate (25) comprises:
heating a working fluid by indirect heat transfer with the reformate (25) from step (a), and heating the raw water (53) by indirect heat transfer with the working fluid.

Aspect 14. The process of aspect 13 wherein the working fluid is water, wherein the working fluid water is evaporated to form a stream of steam (161) having a pressure ranging from 15.2 kPa to 304 kPa (absolute) when heated by the reformate (25) from step (a), and wherein at least a portion of the stream of steam (161) is condensed when heating the raw water.

Aspect 15. The process of any one of aspects 12 to 14 further comprising:

forming a steam product (150) from at least a portion of the boiler feed water stream (123) withdrawn from the deaerator (110) or forming no steam product (150);

wherein the step of forming the hydrogen-containing product (105) comprises separating at least a portion of the reformate by pressure swing adsorption to produce the hydrogen-containing product (105) and a by-product gas (115);

wherein the hydrogen-containing product (105) has a mass flow rate, $m_{H_2}$, the steam product (150) exported from the process has a mass flow rate, $m_{steam}$, where $m_{steam}=0$ when no steam product is formed, the reformer feed gas mixture (15) has a reformer feed gas mixture mass flow rate, the first water feed stream (87) has a first feed water feed stream mass flow rate, the second water feed stream (85) has a second water feed stream mass flow rate, the fuel (5) has a fuel mass flow rate, and the oxidant gas (3) has an oxidant gas mass flow rate; and wherein the reformer feed gas mixture mass flow rate, the first water feed stream mass flow rate, the second water feed stream mass flow rate, the fuel mass flow rate, and the oxidant gas mass flow rate are selected such that $$0 \le \frac{m_{steam}}{m_{H_2}} \le 13.$$

wherein the hydrogen-containing product is at least 95 mole % hydrogen.

Aspect 16. The process of any one of aspects 1 to 15 further comprising:

heating raw water (53) by indirect heat transfer with the combustion product gas (35) from step (b) thereby heating the raw water for purification thereof by a thermal water purification process to produce purified water (42), and thereby cooling the combustion products gas, wherein the combustion product gas is cooled to heat the raw water before the combustion product gas is cooled to heat the first water feed stream (87);

wherein the one or more liquid water products further comprise the purified water (42).

Aspect 17. The process of aspect 16 wherein the step of heating raw water (53) by indirect heat transfer with the combustion product gas (35) comprises:

heating a working fluid by indirect heat transfer with the combustion product gas from step (b), and heating the raw water by indirect heat transfer with the working fluid.

Aspect 18. The process of aspect 17 wherein the working fluid is water, wherein the working fluid water is evaporated to form a stream of steam (221) having a pressure ranging from 15.2 kPa to 304 kPa (absolute) when heated by the combustion product gas (35) from step (b), and wherein at least a portion of the stream of steam (221) is condensed when heating the raw water (53).

Aspect 19. The process of any one of aspects 16 to 18 further comprising:

forming a steam product (150) from at least a portion of the boiler feed water stream (123) withdrawn from the deaerator (110) or forming no steam product (150);

wherein the step of forming the hydrogen-containing product (105) comprises separating at least a portion of the reformate by pressure swing adsorption to produce the hydrogen-containing product (105) and a by-product gas (115);

wherein the hydrogen-containing product (105) has a mass flow rate, $m_{H_2}$, the steam product (150) exported from the process has a mass flow rate, $m_{steam}$, where $m_{steam}=0$ when no steam product is formed, the reformer feed gas mixture (15) has a reformer feed gas mixture mass flow rate, the first water feed stream (87) has a first feed water feed stream mass flow rate, the second water feed stream (85) has a second water feed stream mass flow rate, the fuel (5) has a fuel mass flow rate, and the oxidant gas (3) has an oxidant gas mass flow rate; and wherein the reformer feed gas mixture mass flow rate, the first water feed stream mass flow rate, the second water feed stream mass flow rate, the fuel mass flow rate, and the oxidant gas mass flow rate are selected such that $$0 \le \frac{m_{steam}}{m_{H_2}} \le 7.$$

Aspect 20. The process of any one of aspects 12 to 19 wherein the raw water comprises at least one of salt water, river water, stream water, lake water, municipal recycled water, industrial recycled water, and groundwater.

Aspect 21. The process of any one of aspects 12 to 20 wherein the thermal water purification process is one of a multiple effect distillation process and a multi-stage flash process.

BRIEF DESCRIPTION OF SEVERAL VIEWS OF THE DRAWINGS

FIG. 1b is a process flow diagram for a multi-stage flash process for integration with the steam-hydrocarbon reforming process of FIG. 1a.

FIG. 1c is a process flow diagram for a multiple effect distillation process for integration with the steam-hydrocarbon reforming process of FIG. 1a.

FIG. 2b is a process flow diagram for a multi-stage flash process for integration with the steam-hydrocarbon reforming process of FIG. 2a.

FIG. 3b is a process flow diagram for a multi-stage flash process for integration with the steam-hydrocarbon reforming process of FIG. 3a.

FIG. 3c is a process flow diagram for a multiple effect distillation process for integration with the steam-hydrocarbon reforming process of FIG. 3a.

DETAILED DESCRIPTION

Figure 1A:
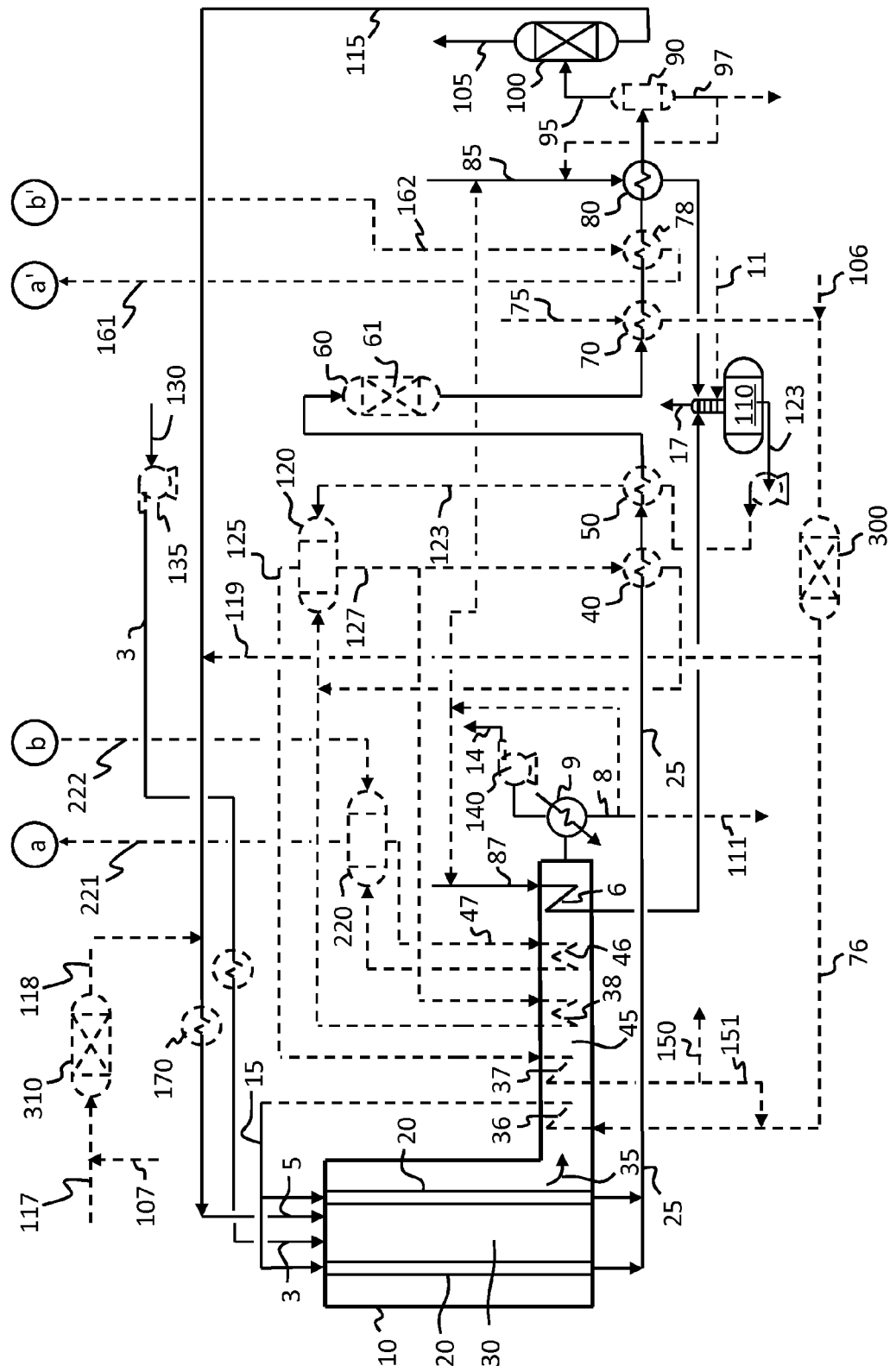
FIG. 1a is a process flow diagram for a steam-hydrocarbon reforming process showing a first portion of make-up water heated by combustion product gas and a second portion of make-up water heated by reformate, and also showing the option of providing heat energy to a thermal water purification process via a working fluid such as water/steam to transfer heat energy from the combustion product gas and/or reformate to the thermal water purification process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The term "plurality" means two or more unless explicitly recited to require more than two, for example, "a plurality of three or more" which means three or more.

The phrase "at least a portion" means "a portion or all." The at least a portion of a stream may have the same composition as the stream from which it is derived. The a least a portion of a stream may have a different composition to that of the stream from which it is derived. The at least a portion of a stream may include specific components of the stream from which it is derived.

As used herein a "divided portion" of a stream is a portion having the same chemical composition as the stream from which it was taken.

As used herein, "first," "second," "third," etc. are used to distinguish from among a plurality of features and/or steps and does not indicate the relative position in time or space.

Downstream and upstream refer to the intended flow direction of the process fluid transferred. If the intended flow direction of the process fluid is from the first device to the second device, the second device is in downstream fluid flow communication of the first device.

The term "depleted" means having a lesser mole % concentration of the indicated component than the original stream from which it was formed. "Depleted" does not mean that the stream is completely lacking the indicated component.

As used herein, "heat" and "heating" may include both sensible and latent heat and heating.

As used herein, the units for pressure are absolute pressure, not gauge pressure, unless specifically stated to be gauge pressure.

As used herein, "raw water" is any impure water, for example, one or more of salt water (ocean water, seawater, and brackish water), surface water such as a stream, river, or lake, groundwater, municipal/industrial reuse or recycled water, or waste water from an industrial process. Raw water is generally less pure than conventional industrial feed water, such as potable water.

As used herein, "purified water" means any distilled water (i.e. distillate or condensed water) from a thermal water purification process.

As used herein, "reformate" or "a reformate stream" is any stream comprising hydrogen and carbon monoxide formed from the reforming reaction of a hydrocarbon and steam.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate a working fluid, e.g. water to steam, in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon, kettle boiler or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

In the claims, letters may be used to identify claimed process steps (e.g., (a), (b), (c), (d), etc.). These letters are used to aid in referring to the process steps and are not intended to indicate the order in which claimed steps are performed, unless and only to the extent that such order is specifically recited in the claims.

The present invention relates to a process for producing a $H_2$-containing product and one or more liquid water products. The $H_2$-containing product may be, for example, a purified $H_2$ product gas or a synthesis gas product having a desired $H_2$:CO molar ratio. The one or more liquid water products may be water condensed from a combustion product gas and/or purified water from a thermal water purification process.

A "thermal purification process" as used herein is any process that uses a heat source to evaporate raw water and condenses the evaporated water vapor into a condensate or distillate (i.e. the purified water). The thermal water purification process may be, for example, a known commercial thermal desalination process such as multi-stage flash (MSF) or multiple effect distillation (MED).

The process is described with reference to the drawings, wherein like reference numbers refer to like elements throughout the drawings. In addition, reference numerals that are introduced in the specification in association with a drawing figure may be repeated in one or more subsequent figures without additional description in the specification in order to provide context for other features.

The process utilizes catalytic steam-hydrocarbon reforming. Catalytic steam-hydrocarbon reforming, also called steam methane reforming (SMR), catalytic steam reforming, or steam reforming, is defined as any process used to convert reformer feedstock into reformate by reaction with steam over a catalyst. Reformate, also called synthesis gas, or simply syngas, as used herein is any mixture comprising hydrogen and carbon monoxide. The reforming reaction is an endothermic reaction and may be described generally as $C_nH_m + n\ H_2O \rightarrow n\ CO + (m/2+n)\ H_2$. Hydrogen is generated when reformate is generated.

FIG. 1a is a process flow diagram for a catalytic steam-hydrocarbon reforming process suitable for carrying out the present process.

The process comprises introducing a reformer feed gas mixture 15 into a plurality of catalyst-containing reformer tubes 20 in a reformer furnace 10, reacting the reformer feed gas mixture 15 in a reforming reaction under reaction conditions effective to form a reformate 25 comprising $H_2$, GO, $CH_4$, and $H_2O$, and withdrawing the reformate 25 from the plurality of catalyst-containing tubes 20 of the reformer furnace 10.

The reformer feed gas mixture 15 may be any feed gas mixture suitable for introducing into a catalytic steam-hydrocarbon reformer for forming a reformate. The reformer feed gas mixture 15 may comprise a hydrocarbon feedstock 75 that has been desulphurized and steam 151, and/or a mixture of prereformed hydrocarbon feedstock and steam. Feedstock may be natural gas, methane, naphtha, propane, refinery fuel gas, refinery off-gas, or other suitable reformer feedstock known in the art.

As shown in FIG. 1a, hydrocarbon feedstock 75 may be heated by indirect heat transfer with reformate 25 in heat exchanger 70 and passed to hydrodesulphurization unit 300. Hydrogen 106 for hydrodesulphurization may be added to the feedstock before or after heating the hydrocarbon feedstock 75. Hydrogen product 105 may used to provide hydrogen 106. At least a portion 76 of the desulphurized feedstock may be blended with steam 151 and then further heated by combustion product gas 35 in the convection section 45 of reformer 10 prior to being introduced into the catalyst-containing reformer tubes 20 as reformer feed gas mixture 15.

The reforming reaction takes place in the plurality of catalyst-containing reformer tubes 20 in reformer furnace 10. A reformer furnace, also called a catalytic steam reformer, steam methane reformer, and steam-hydrocarbon reformer, is defined herein as any fired furnace used to convert feedstock containing elemental hydrogen and carbon to reformate by a reaction with steam over a catalyst with heat provided by combustion of a fuel.

Reformer furnaces with a plurality of catalyst-containing reformer tubes, i.e. tubular reformers, are well known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 25 in the plurality of catalyst-containing reformer tubes 20 may comprise a temperature ranging from 500° C. to 1000° C. and a pressure ranging from 203 kPa to 5,066 kPa (absolute). The reaction condition temperature may be as measured by any suitable temperature sensor, for example a type J thermocouple. The reaction condition pressure may be as measured by any suitable pressure sensor known in the art, for example a pressure gauge as available from Mensor.

The process comprises combusting a fuel 5 with an oxidant gas 3 in a combustion section 30 of the reformer furnace 10 external to the plurality of catalyst-containing reformer tubes 20 under conditions effective to combust the fuel 5 to form a combustion product gas 35 comprising $CO_2$ and $H_2O$. Combustion of the fuel 5 with the oxidant gas 3 generates heat to supply energy for reacting the reformer feed gas mixture 15 inside the plurality of catalyst-containing reformer tubes 20. The combustion product gas 35 is withdrawn from the combustion section 30 of the reformer furnace 10 and passed to the convection section 45 of the reformer furnace to supply heat to other process streams. The combustion section (also called the radiant, radiation, or radiative section) of the reformer furnace is that part of the reformer furnace containing the plurality of catalyst-containing reformer tubes. The convection section of the reformer furnace is that part of the reformer furnace containing heat exchangers other than the plurality of catalyst-containing reformer tubes. The heat exchangers in the convection section may be for heating process fluids other than reformate, such as for water/steam, air, by-product gas, reformer feed gas prior to introduction into the catalyst-containing reformer tubes, etc.

Conditions effective to combust the fuel may comprise a temperature ranging from 600° C. to 1500° C. and a pressure ranging from 99 kPa to 101.4 kPa (absolute). The temperature may be as measured by a thermocouple, an optical pyrometer, or any other calibrated temperature measurement device known in the art for measuring furnace temperatures. The pressure may be as measured by any suitable pressure sensor known in the art, for example a pressure gauge as available from Mensor.

The fuel 5 may comprise a by-product gas 115 from a pressure swing adsorber 100 and a supplemental fuel 118; 119 often called trim fuel. The by-product gas 115 may be heated before being used as fuel 5. The by-product gas 115 may be heated by indirect heat transfer with the combustion products gas and/or the reformate.

Heating the by-product gas 115 by indirect heat transfer with the combustion product gas encompasses heating a working fluid (e.g. water) by indirect heat transfer with the combustion product gas in a first heat exchanger and heating the by-product gas by indirect heat transfer with the heated working fluid in a second heat exchanger. Heating the by-product gas by indirect heat transfer with the reformate encompasses heating a working fluid (e.g. water) by indirect heat transfer with the reformate in a first heat exchanger and heating the by-product gas by indirect heat transfer with the heated working fluid in a second heat exchanger. The reformate and/or the combustion product gas may be used to heat water which is used to heat the by-product gas. The water may be heated to a temperature ranging from 104° C. to 238° C. The hot water may be boiler feed water withdrawn from the boiler feed water network. The hot water may be hot water from a separate closed loop of circulating water/steam.

As shown in FIG. 1a, the process may comprise introducing a hydrocarbon feedstock 117 along with hydrogen 107 into a hydrodesulphurization unit 310 to remove sulfur from the hydrocarbon feedstock thereby forming the supplemental fuel 118. Alternatively, or in addition, the process may comprise introducing a hydrocarbon feedstock 75 into a hydrodesulphurization unit 300 to remove sulfur from the hydrocarbon feedstock for forming the reformer feed gas mixture 15 from a first portion and the supplemental fuel 119 from a second portion. The hydrocarbon feedstock 117 may be from the same source or a different source than the hydrocarbon feedstock 75.

The oxidant gas 3 is a gas containing oxygen and may be air, oxygen-enriched air, oxygen-depleted air, industrial grade oxygen, or any other oxygen-containing gas known for use in a reformer furnace for combustion. For example, as shown in FIG. 1a, air 130 may be compressed in compressor 135 and passed to the reformer furnace as oxidant gas 3.

If the fuel and/or oxidant gas comprise nitrogen, the combustion product gas will also comprise nitrogen.

The process further comprises heating a first water feed stream 87 by indirect heat transfer with the combustion product gas 35 thereby cooling the combustion product gas 35. The first water feed stream 87 provides a portion of what is typically called "make-up water" to the reforming process. The first water feed stream is water generally only in need of deaeration in order to be suitable as boiler feed water. The first water feed stream may be distilled water, treated water (decalcified, filtered, etc.) or other suitable water known in the art.

As shown in FIG. 1a, after heating various other process streams, the combustion product gas 35 exchanges heat with the first water feed stream 87 in heat exchanger 6. The first water feed stream 87 extracts low level heat from the combustion product gas 35. The first water feed stream 87 may be heated by the combustion product gas 35 to a temperature ranging from 65° C. to 125° C. The temperature of the first water feed stream may be as measured by any suitable temperature sensor, for example a type J thermocouple where the water passes over the sensing end of the thermocouple. The combustion product gas 35 may be cooled to a temperature ranging from 50° C. to 85° C. as a result of heating the first water feed stream 87. The temperature of the combustion product gas may be as measured by any suitable temperature sensor, for example a type J thermocouple where the combustion product gas passes over the sensing end of the thermocouple.

As shown in FIG. 1a, the combustion product gas 35 may heat a number of different process streams. The combustion product gas 35 may heat the streams in various different configurations (order of heating) prior to heating the first water feed stream 87. FIG. 1a shows the combustion product gas 35 heating the reformer feed gas mixture 15, followed by superheating the steam 125 from steam drum 120. A portion of the superheated steam may be used to form the reformer feed gas mixture 15 and another portion used to form a steam product 150 (i.e. export steam). The process may comprise forming steam product 150 for export from at least a portion of the boiler feed water stream 123 withdrawn from the deaerator 110. The combustion product gas then heats a portion of boiler feed water 127 from steam drum 120 to form a two-phase mixture of steam and water of which at least a portion is returned to the steam drum 120.

The process comprises introducing the combustion product gas 35 into a condenser 9 after the combustion product gas has been cooled by the first water feed stream 87, cooling the combustion product gas in the condenser by indirect heat transfer with a cooling fluid thereby condensing water from the combustion product gas to form a liquid water stream 8. The liquid water stream 8 is separated from a water-depleted combustion product gas stream 14, liquid water stream 8 is withdrawn from the condenser, and water-depleted combustion product gas stream 14 is withdrawn from the condenser 9. The combustion product gas may be drawn through the convection section by an induction fan 140.

The one or more liquid water products comprise the liquid water stream 8 withdrawn from the condenser 9. A portion or all of the one or more liquid water products may be exported for use outside the process as water stream 111 or used within the process, for example as make-up water. The first water feed stream 87 may comprise liquid water stream 8.

The combustion product gas 35 contains water vapor as a combustion product. The amount of water in the combustion product gas may be about 60% to about 90% of the total water reacted to form the reformate in the plurality of catalyst-containing tubes, depending on the reaction conditions and the export steam production. Recovering water from the combustion product gas can significantly reduce the external water demand of the catalytic steam-hydrocarbon reforming process.

Trim fuel generally contains sulfur that converts to $SO_3$ in the combustion product gas upon combustion. $SO_3$ will condense and corrode the heat recovery equipment when the combustion product gas temperature has a temperature less than about 121° C.

In the present process, the sulfur may be removed from the trim fuel as described above using hydrodesulphurization unit 300 and/or hydrodesulphurization unit 310. Alternatively the heat recovery equipment may be replaced regularly (i.e. using sacrificial heat exchangers) and/or corrosion resistant materials may be used in the construction of the heat exchange equipment.

The cooling fluid for condensing water from the combustion product gas in the condenser in the present process may be raw water. The raw water may comprise at least one of salt water, river water, stream water, lake water, municipal recycled water, industrial recycled water, and groundwater. The cooling fluid may be salt water.

The process comprises heating a second water feed stream 85 by indirect heat transfer with at least a portion of the reformate 25 withdrawn from the plurality of catalyst-containing tubes 20, thereby cooling the reformate 25. The second water feed stream may be distilled water, treated water (decalcified, filtered, etc.) or other suitable water known in the art. As shown in FIG. 1a, after heating various other process streams and passing through an optional shift reactor 60, the reformate 25 exchanges heat with the second water feed stream 85 in heat exchanger 80. The second water feed stream 85 extracts low level heat from the reformate 25. The second water feed stream 85 may be heated by the reformate 25 to a temperature ranging from 65° C. to 125° C. The temperature of the second water feed stream 85 may be as measured by any suitable temperature sensor, for example a type J thermocouple where the water passes over the sensing end of the thermocouple. The reformate 25 may be cooled to a temperature ranging from 25° C. to 150° C. as a result of heating the second water feed stream 85. The temperature of the reformate 25 may be as measured by any suitable temperature sensor, for example a type J thermocouple where the reformate passes over the sensing end of the thermocouple.

The second liquid water feed stream 85 may comprise liquid water stream 8 from condenser 9 formed from the combustion product gas 35.

As shown in FIG. 1a, the reformate may exchange heat with a number of streams and may be passed to a shift reactor 60 containing shift catalyst 61. In the exemplary embodiment shown in FIG. 1a, the reformate 25 withdrawn from the plurality of catalyst-containing reformer tubes 20 is passed to heat exchanger 40 where the reformate 25 heats a portion of boiler feed water stream 127 thereby forming a two-phase water and steam stream that is reintroduced into steam drum 120. Steam 125 is withdrawn from the steam drum and water is passed to any one of a number of heat exchangers to further heat the boiler feed water. The reformate 25 is passed from heat exchanger 40 to heat exchanger 50 where the reformate 25 heats a stream of boiler feed water 123 that is withdrawn from deaerator 110.

In the exemplary embodiment shown in FIG. 1a, the reformate 25 is passed from heat exchanger 50 to shift reactor 60. The process may comprise reacting the reformate 25 from heat exchanger 50 in the presence of a shift catalyst 61 under reaction conditions effective to form additional hydrogen in the reformate 25. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2 + H_2$. The reaction is affected by passing carbon monoxide and water through a bed of a suitable catalyst. The reaction conditions effective to form additional hydrogen in the reformate 25 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. Since the article "a" means "one or more," one or more shift reactors may be used in the process.

For high temperature shift, an inlet temperature in the range 310° C. to 370° C., and an outlet temperature in the range 400° C. to 500° C. are typical. Usually an iron oxide/chromia catalyst is used for high temperature shift.

For low temperature shift, an inlet temperature in the range 190° C. to 230° C., and an outlet temperature in the range 220° C. to 250° C. are typical. Usually a catalyst comprising metallic copper, zinc oxide, and one or more other difficulty reducible oxides such as alumina or chromia is used for low temperature shift.

For medium temperature shift, an inlet temperature in the range 190° C. to 230° C. and an outlet temperature of up to 350° C. are typical. A suitably formulated supported copper catalyst can be used for medium temperature shift. Medium temperature shift may be preferred for the exemplary process.

A combination may include a sequence of high temperature shift, cooling by indirect heat exchange, and low temperature shift. If desired, either shift stage can be subdivided with interbed cooling.

In the exemplary embodiment shown in FIG. 1a, after passing through the shift reactor 60, the reformate 25 is passed to heat exchanger 70 where hydrocarbon feedstock 75 is heated and reformate 25 is cooled. Reformate 25 is then passed to heat exchanger 78 where the reformate heats raw water for purification of the raw water by a thermal water purification process to produce purified water, discussed in more detail below. Reformate is then passed to heat exchanger 80 where the process step of heating the second water feed stream 85 by indirect heat transfer with at least a portion of the reformate 25 withdrawn from the plurality of catalyst-containing tubes 20 takes place, thereby cooling the reformate 25.

After the reformate 25 is cooled by heat exchange with the second water feed stream 85, the reformate may be passed to a knock-out drum 90 and separated into a liquid water stream 97 and a water-depleted reformate portion 95. The one or more liquid water products may comprise liquid water stream 97. At least one of the first water feed stream 87 and the second water feed stream 85 may comprise the liquid water stream 97.

The process further comprises forming the hydrogen-containing product 105 from the reformate 25 after the reformate 25 has heated the second water feed stream 85. The hydrogen-containing product 105 may be formed from at least a portion of the reformate 25. The hydrogen-containing product 105 may be formed from the water-depleted reformate portion 95.

The step of forming the hydrogen-containing product 105 may be done by cryogenic means, for example using a cold box to produce an oxogas having a desired $H_2$:CO molar ratio.

The step of forming the hydrogen-containing product 105 may comprise separating at least a portion of the reformate by pressure swing adsorption to produce the hydrogen-containing product 105 and a by-product gas 115. The reformate may be separated by pressure swing adsorption in pressure swing adsorber 100.

Separating a reformate to form a hydrogen-containing product (e.g. hydrogen) and a by-product gas by pressure swing adsorption is conventional and well-known. Suitable adsorbents and pressure swing adsorption cycles are known and may be selected. Any suitable number of pressure swing adsorption vessels may be selected and used.

The by-product gas 115 may be heated by indirect heat transfer with the combustion product gas. The by-product gas 115 may be heated by hot water from a boiler feed water circulating loop.

The present process is characterized by a water feed stream being heated by the combustion product gas 35 and another water feed stream being heated by the reformate 25. After being heated, the water feed streams are passed to a deaerator 110 where dissolved gases are removed.

The process comprises passing the first water feed stream 87 and the second water feed stream 85 to a deaerator 110. The first water feed stream is passed to the deaerator 110 after being heated by the combustion product gas 35. The second water feed stream is passed to the deaerator 110 after being heated by the reformate 25. Dissolved gases are stripped from the first water feed stream 87 and from the second water feed stream 85 in the deaerator 110. Steam 11 may be introduced into the deaerator 110 or steam may be formed in-situ by heating or flashing. Steam aids in stripping the dissolved gases. A vent stream 17 is withdrawn from deaerator 110. The vent stream 17 comprises steam and gases formed from the dissolved gases stripped from the first water feed stream 87 and from the second water feed stream 85. A boiler feed water stream 123 is withdrawn from the deaerator 110. The boiler feed water stream 123 comprises at least a portion of the first water feed stream 87 and at least a portion of the second water feed stream 85. The boiler feed water stream may be pumped to a higher pressure, heated, and passed to steam drum 120.

Figure 1B:
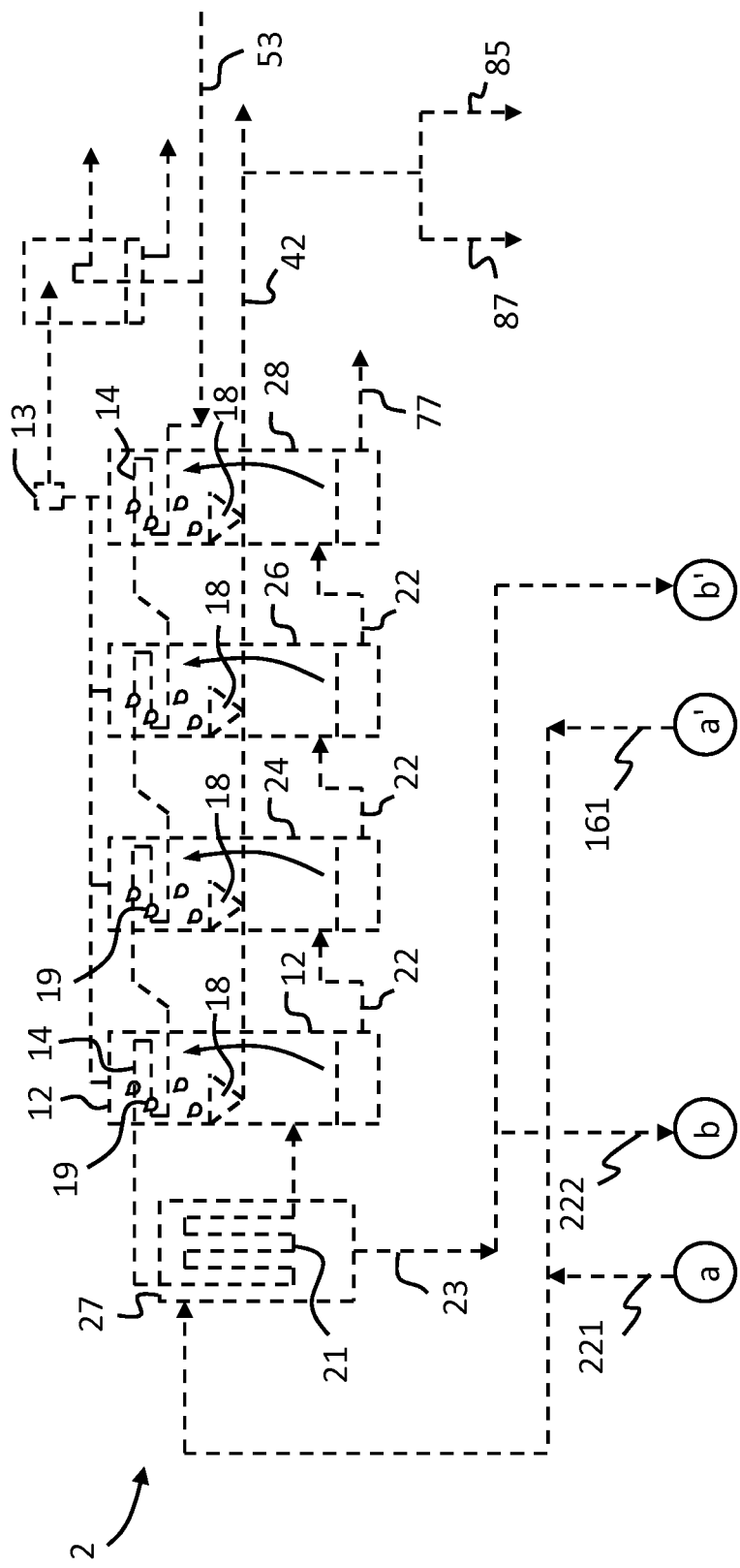
Figure 1C:
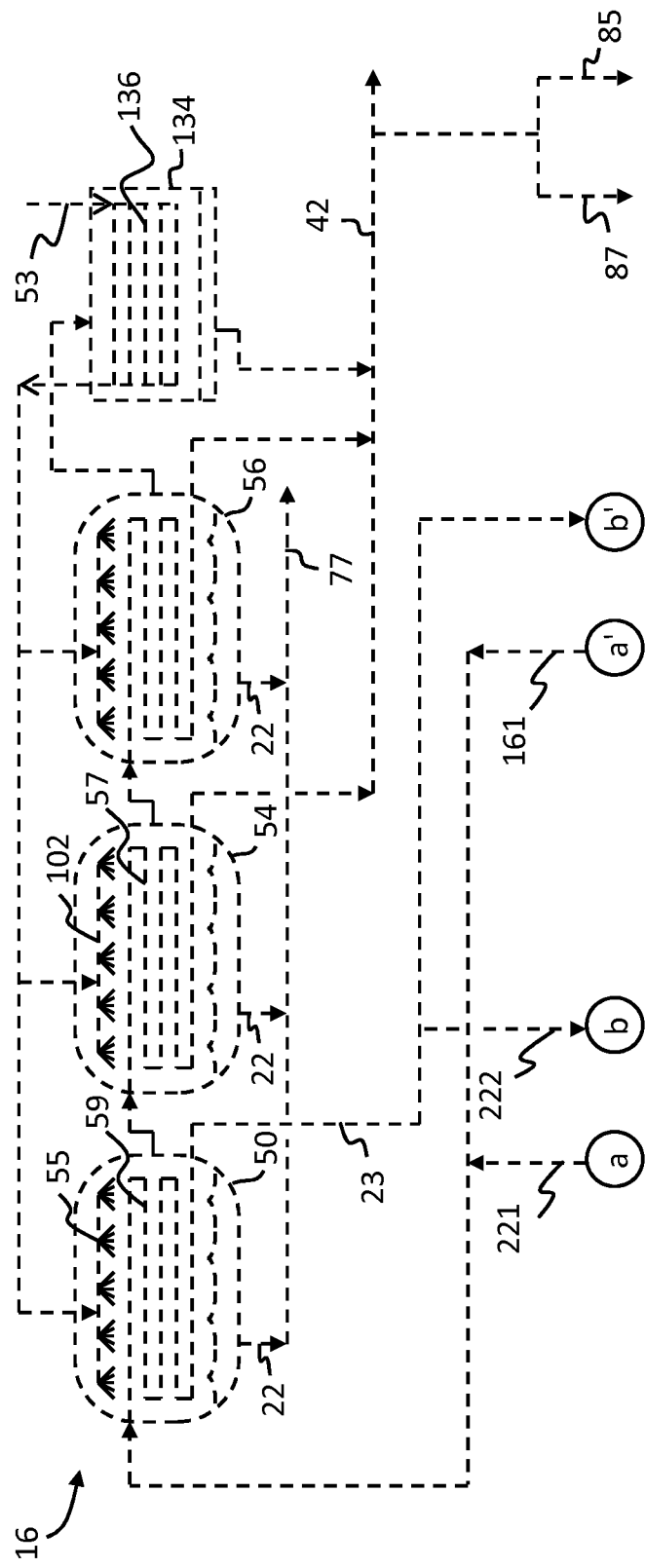

The reformate forming process may be conveniently integrated with a thermal water purification process as shown in the figures. The reformate forming process in FIG. 1a may be integrated with the multiple stage flash process shown in FIG. 1b and/or the multiple effect distillation process shown in FIG. 1c. The connection of streams between FIG. 1a and FIG. 1b is shown by way of a, b, a' and b'. The connection of streams between FIG. 1a and FIG. 1c is also shown by way of a, b, a' and b'.

The process may further comprise heating raw water 53 by indirect heat transfer with the reformate 25 thereby heating the raw water for purification thereof by a thermal water purification process to produce purified water 42, and thereby cooling the reformate 25. The reformate 25 is cooled to heat the raw water 53 before (shown) or after (not shown) the reformate 25 is cooled to heat the second water feed stream 85.

The one or more liquid water products may comprise the purified water 42. The first water feed stream 87 and the second water feed stream 85 may each comprise purified water 42.

As shown in the embodiment in FIG. 1a, the step of heating raw water 53 by indirect heat transfer with the reformate 25 may include the use of a working fluid, for example, water and/or steam. In case a working fluid is used, the process may comprise heating the working fluid by indirect heat transfer with the reformate 25 and heating the raw water 53 by indirect heat transfer with the working fluid. In the embodiment shown in FIG. 1a combined with FIG. 1b, the working fluid is water, and water 162 is passed to kettle boiler 78 to be heated and evaporated by reformate 25 to form a stream of steam 161. Steam 161 may have a pressure ranging from 15.2 kPa to 304 kPa (absolute) when heated by the reformate 25. The pressure of the stream of steam 161 may be as measured by any suitable pressure sensor, for example a pressure gauge as available from Mensor. Steam 161 is passed to the multiple stage flash process in FIG. 1b. At least a portion of the stream of steam 161 may be condensed when heating the raw water 53.

In a less preferred alternative, heat transfer between the reformate 25 and the water may be accommodated by use of a heat exchanger/steam drum combination instead of a kettle boiler.

In FIG. 1b, steam 161 is passed to heating chamber 27 of a representative multi-stage flash process 2. While FIG. 1b shows 4 stages, any suitable number of stages may be used. The steam passes over metallic heat transfer coil 21, disposed internally of heating chamber 27 through which raw water 53 flows and is heated and subsequently enters first stage flash tank 12.

Raw water 53 enters heat transfer coil 14 of flash tank chamber 28. Raw water inside coil 14 is heated by heat transfer as water vapor condenses against the heat transfer coil 14. The pressure is successively reduced at each stage from flash tank 12 through to flash tank 28 (i.e. $P_{12} > P_{24} > P_{26} > P_{28}$, where $P_{12}$ is the pressure in flash tank 12, $P_{24}$ is the pressure in flash tank 24, $P_{26}$ is the pressure in flash tank 26, and $P_{28}$ is the pressure in flash tank 28).

Purified water condensate produced by this condensation process is collected in collector 18 of flash tank 28 and exits the tank as a stream of purified water 42. The one or more liquid products may comprise purified water 42.

The incoming raw water is heated further as it passes through the heat transfer coils 14 of flash tanks 28, 26, 24, and then 12. Heated raw water exits flash tank 12 and enters the heat transfer coil 21 of heating chamber 27. Steam 161 enters heating chamber 27 and contacts the heat transfer coil 21 to effect heat transfer to further heat raw water passing internally through the heat transfer coil 21. Steam 161 condenses, exits heating chamber 27 as condensate 23, and is returned to kettle boiler 78.

Water vapor which condenses upon contact with coil 14 forms a purified water condensate 19 which drips from the coil 14 into receptacle 18 of each flash tank and is collected as purified water 42. Evaporation of the raw water causes the low quality reject water 22 in the bottom of the flash tanks to become increasingly concentrated in impurities. In the case of desalination of salt water, the low quality reject water 22 is brine and the brine in the bottom of the flash tanks becomes increasingly concentrated with salt. Low quality reject water 22 passes to flash tanks 24, 26, and 28, respectively, where the thermal water purification process repeats at progressively lower pressures. Low quality reject water 77 which is concentrated in impurities exits flash tank 28 and is typically discharged.

Alternatively (not shown in the figures), a portion of the low quality reject 77 is withdrawn and joins the raw water 53 as a portion of the feed water to the thermal water purification process. This low quality reject water recycle increases the conversion rate of the raw water into the purified water, also known as the recovery of the raw water. The higher the amount of recycled low quality reject water, the higher the impurity in the feed water to the thermal water purification process. The amount of recycled low quality reject water depends on the allowable impurity level of the feed water to the thermal water purification process.

Alternatively or in addition, the process may further comprise heating raw water 53 by indirect heat transfer with the combustion product gas 35 thereby heating the raw water for purification thereof by a thermal water purification process to produce purified water 42, and thereby cooling the combustion product gas. The combustion product gas is cooled to heat the raw water before the combustion product gas is cooled when heating the first water feed stream 87. The one or more liquid products may comprise the purified water 42.

As shown in the embodiment of FIG. 1a, the step of heating raw water 53 by indirect heat transfer with the combustion product gas 35, may include the use of a working fluid, for example, water and/or steam. In case a working fluid is used, the process may comprise heating the working fluid by indirect heat transfer with the combustion product gas 35 and heating the raw water 53 by indirect heat transfer with the working fluid. In the embodiment shown in FIG. 1a combined with FIG. 1b, water 47 is passed from steam drum 220 to heat exchanger 46 to be heated by combustion product gas 35. The heated water and/or steam is passed back to steam drum 220 where it flashes in steam drum 220. Steam 221 is withdrawn from steam drum 220 and passed to the multiple stage flash process in FIG. 1b.

The working fluid water may be evaporated to form a stream of steam 221 having a pressure ranging from 15.2 kPa to 304 kPa (absolute) when heated by the combustion product gas 35. The pressure of the stream of steam 221 may be as measured by any suitable pressure sensor or gauge known in the art for example a pressure gauge as available from Mensor. At least a portion of the stream of steam 221 may be condensed when heating the raw water 53.

In FIG. 1b, steam 221 is passed to heating chamber 27 of a representative multi-stage flash process 2. The steam passes over metallic heat transfer coil 21, disposed internally of heating chamber 27 through which raw water 53 flows and is heated and subsequently enters first stage flash tank 12.

The multi-stage flash in FIG. 1b is as described above to form purified water 42 and low quality reject water 77. Steam 221 condenses in heating chamber 27, exits heating chamber 27 as condensate 23, and is returned to steam drum as condensate stream 222.

The reformate forming process may also be integrated with a multiple effect distillation process which will be described with reference to FIG. 1a and FIG. 1c.

In case a multiple effect distillation process is used, a working fluid may also be used. The working fluid heated by the reformate may be used to heat the raw water 53 in evaporator 50 of the multiple effect distillation process by indirect heat transfer with the working fluid. In the embodiment shown in FIG. 1a combined with FIG. 1c, the working fluid is water, and water 162 is passed to kettle boiler 78 to be heated by reformate 25. The heated steam 161 is passed to the multiple effect distillation process in FIG. 1c.

FIG. 1c illustrates an embodiment of the process utilizing a representative multiple effect distillation process 16. While shown in FIG. 1c with 3 evaporators, any suitable number of evaporators may be used. FIG. 1c shows steam 161 passed to heat transfer coil 59 of evaporator 50. Steam 161 is condensed in heat transfer coil 59 as a result of heat transfer with raw water 53 brought into contact with the exterior of the coil 59, typically by spraying the raw water through spray bar 55. Condensate is withdrawn from coil 59 and is returned to kettle boiler 78.

The raw water which is sprayed through spray bar 55 onto the exterior of the coil 59 of evaporator 50 undergoes evaporation to form water vapor due to heat transfer between the coil 59 heated by the steam and/or water passing internally therethrough. The water vapor so-produced passes from evaporator 50 into heat transfer coil 57 disposed internally of second evaporator 54. Raw water 53 is sprayed onto the exterior of heat transfer coil 57 through spray bar 102, and the water vapor inside the coil 57 condenses within the heat transfer coil 57, exits second evaporator 54 and is collected as water condensate 42. Water vapor produced by heat transfer in evaporator 54 passed into evaporator 56 where the process is repeated, and so on for as many evaporators as are present in the system. Any suitable number of evaporators may be selected and used. Water vapor exiting the last evaporator in the series (56 in FIG. 1c) is condensed in condenser 134 by contact with heat transfer coil 136 through which cold raw water feed is passed. Purified water condensate so-produced is combined with that produced in the previous evaporators and collected. Low quality reject water 22 collected at the bottom of first evaporator 50 is combined with low quality reject water 22 from the other evaporators 54 and 56, where the thermal water purification process continues at progressively lower pressure operating conditions, and later discharged as low quality reject water 77 which is concentrated in impurities.

Alternatively or in addition, the process may further comprise heating raw water 53 by indirect heat transfer with the combustion product gas 35 thereby heating the raw water for purification thereof by multiple effect distillation to produce purified water 42, and thereby cooling the combustion product gas. The combustion product gas is cooled to heat the raw water before the combustion product gas is cooled when heating the first water feed stream 87.

As shown in the embodiment of FIG. 1a, the step of heating raw water 53 by indirect heat transfer with the combustion product gas 35, may include the use of a working fluid, for example, water and/or steam. In case a working fluid is used, the process may comprise heating the working fluid by indirect heat transfer with the combustion product gas 35 and heating the raw water 53 by indirect heat transfer with the working fluid. In the embodiment shown in FIG. 1a combined with FIG. 1c, water 47 is passed from steam drum 220 to heat exchanger 46 to be heated by combustion product gas 35. The heated water and/or steam is passed back to steam drum 220 where it flashes in steam drum 220. Steam 221 is withdrawn from steam drum 220 and passed to the multiple effect distillation process in FIG. 1c.

The working fluid water may be evaporated to form a stream of steam 221 having a pressure ranging from 15.2 kPa to 304 kPa (absolute) when heated by the combustion product gas 35. The pressure of the stream of steam 221 may be as measured by any suitable pressure sensor or gauge known in the art for measuring steam, for example as available from Mensor. At least a portion of the stream of steam 221 may be condensed when heating the raw water 53.

In the embodiment shown in FIG. 1c, steam 221 is passed to heat transfer coil 59 of evaporator 50 of a representative multiple effect distillation 16. Steam 221 is condensed in heat transfer coil 59 as a result of heat transfer with raw water 53 brought into contact with the exterior of the coil 59, typically by spraying the raw water through spray bar 55. Condensate 23 is withdrawn from coil 59 and is returned to steam drum 220 as condensate stream 222.

The operation of the multiple effect distillation process in FIG. 1c is as described above, but where combustion product gas is used to heat the raw water by indirect heat transfer to form purified water 42 and low quality reject water 77.

Figure 2A:
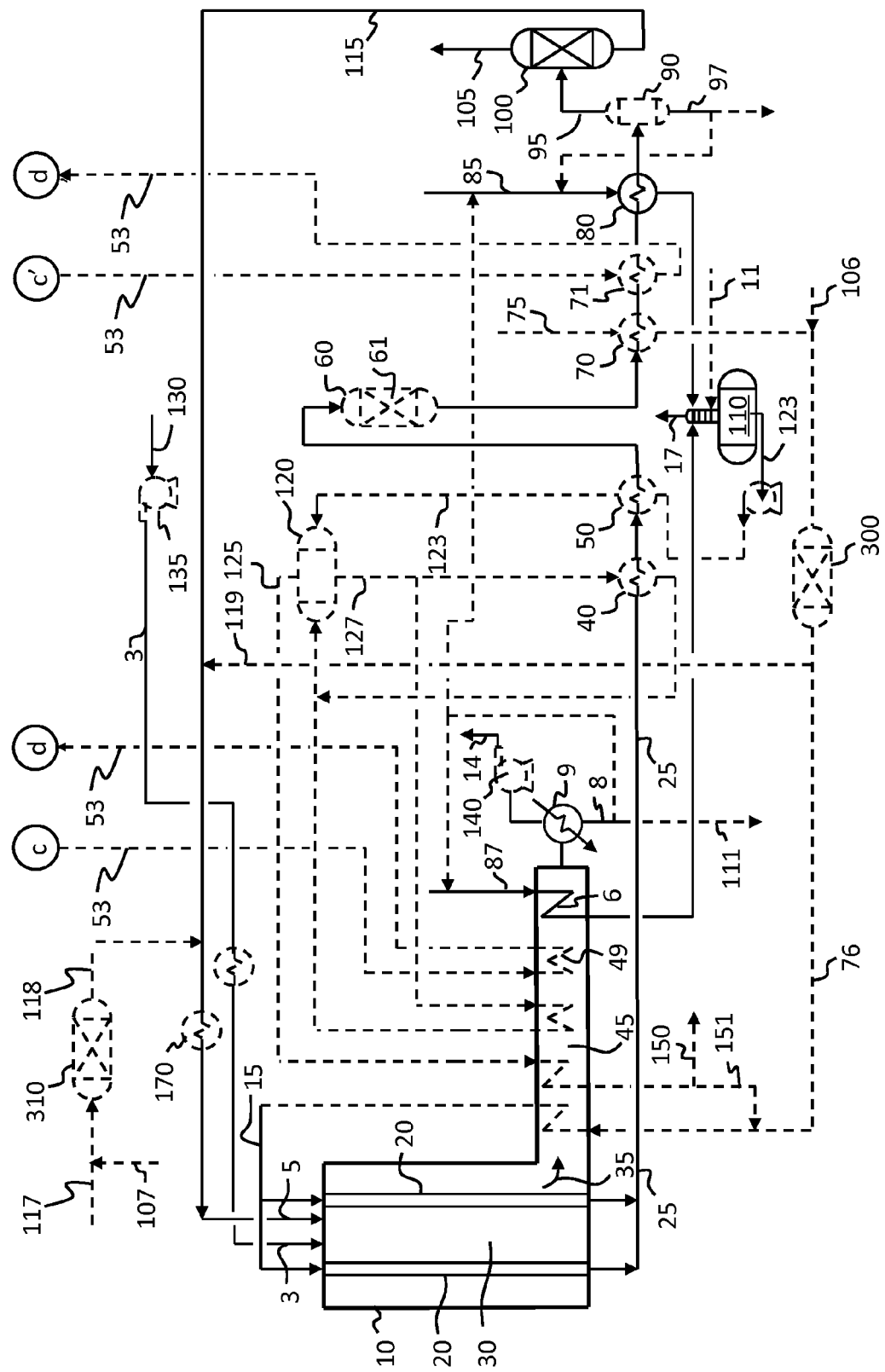
FIG. 2a is a process flow diagram for a steam-hydrocarbon reforming process showing a first portion of make-up water heated by combustion product gas and a second portion of make-up water heated by reformate and also showing the option of providing heat energy to a thermal water purification process without using a working fluid to transfer heat energy from the combustion product gas and/or reformate to the thermal water purification process.
Figure 2B:
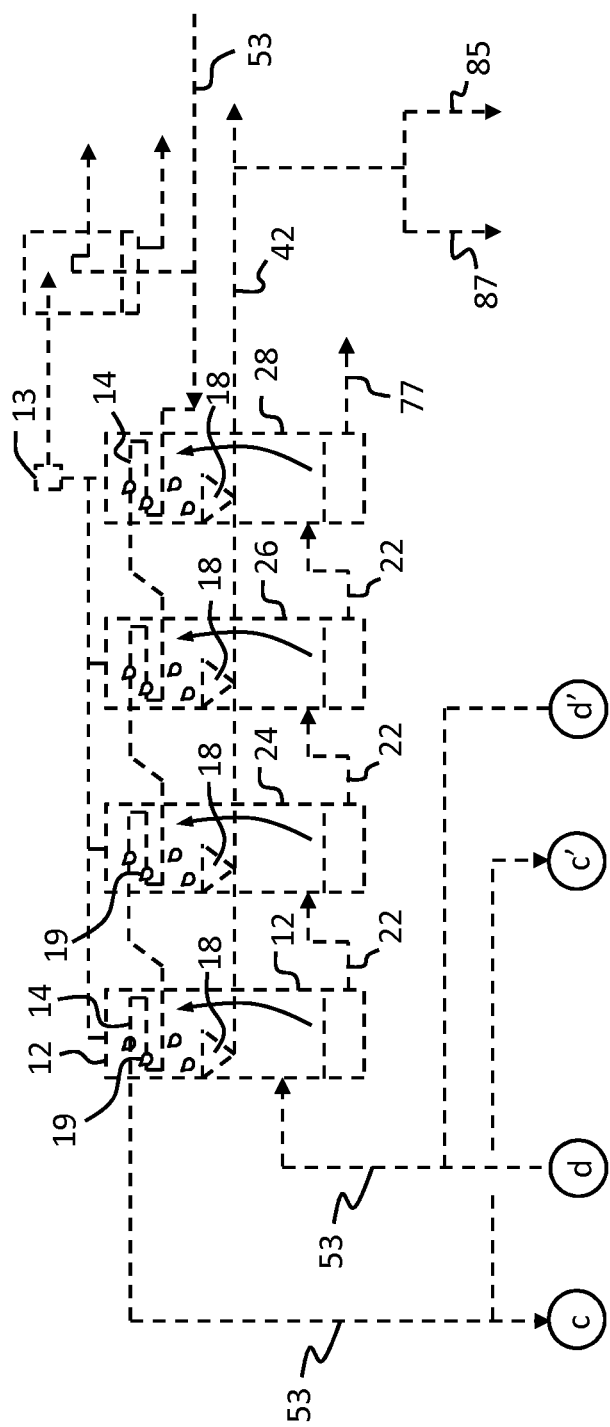

FIG. 2a and FIG. 2b illustrate an integration of a reformate forming process with a multi-stage flash process wherein the step of heating raw water does not include heating of an intermediate working fluid. Embodiments where no intermediate working fluid is used provide the advantage of not requiring a low pressure steam and/or medium pressure steam boiler. Eliminating one stage of heat exchange between the reformate and the raw water also increases the heat exchange temperature differences in the remaining heat exchangers, thereby providing advantages in capital cost and improved thermal efficiency.

Only differences between this embodiment and the earlier described embodiment will be described as the skilled person will readily understand the process flow diagrams of FIG. 2a and FIG. 2b from the drawings and the description of FIG. 1a and FIG. 1b. Like numerals designate like components in the drawings.

In FIG. 2b, the heating chamber 27 is removed and the raw water passed to the reformate forming process for indirect heating by the combustion product gas 35 and/or the reformate without the use of a working fluid.

For the case where the raw water 53 is heated by the combustion product gas, the raw water 53 is passed to heat exchanger 49 in FIG. 2a for indirect heat exchange with combustion product gas 35 in the convection section 45 of the reformer furnace 10.

For the case where the raw water 53 is heated by the reformate, the raw water 53 is passed to heat exchanger 71 in FIG. 2a for indirect heat exchange with the reformate 25.

Figure 3A:
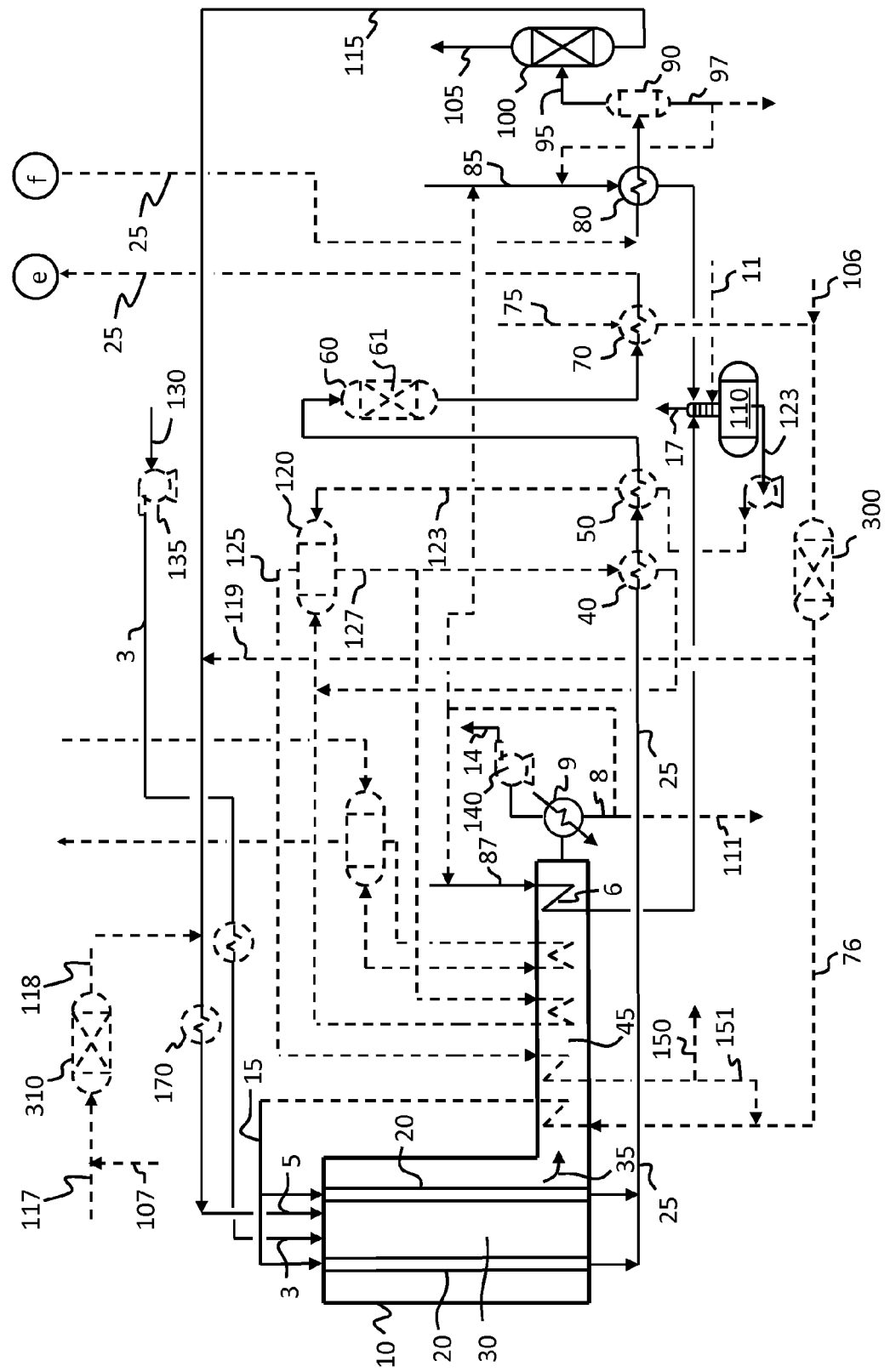
FIG. 3a is a process flow diagram for a steam-hydrocarbon reforming process showing a first portion of make-up water heated by combustion product gas and a second portion of make-up water heated by reformate and also showing the option of providing heat energy to a thermal water purification process without using a working fluid to transfer heat energy from the reformate to the thermal water purification process.
Figure 3B:
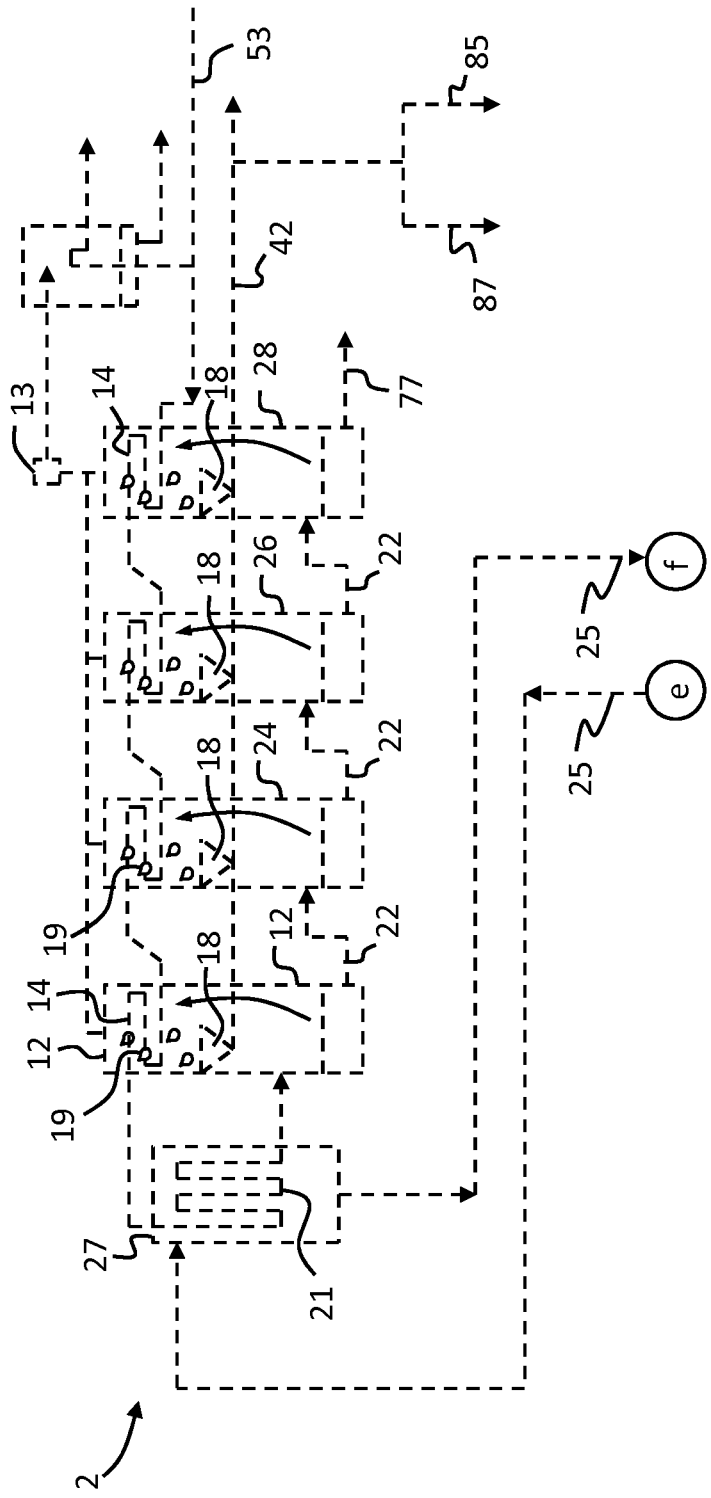

FIG. 3a and FIG. 3b illustrate an alternative integration of a reformate forming process with a multi-stage flash process wherein the step of heating raw water by heat exchange with the reformate does not include heating of an intermediate working fluid.

Only differences between this embodiment and the earlier described embodiment will be described as the skilled person will readily understand the process flow diagrams of FIG. 3a and FIG. 3b from the diagrams themselves and the description of FIG. 1a and FIG. 1b. Like numerals designate like components in the drawings.

In the embodiment shown in FIG. 3a and FIG. 3b, the reformate 25 is passed to the heating chamber 27 (instead of the working fluid steam) to indirectly heat the raw water 53 passing through heat transfer coil 21. Reformate 25 that has been cooled in heating chamber 27 is then passed to the heat exchanger 80.

Figure 3C:
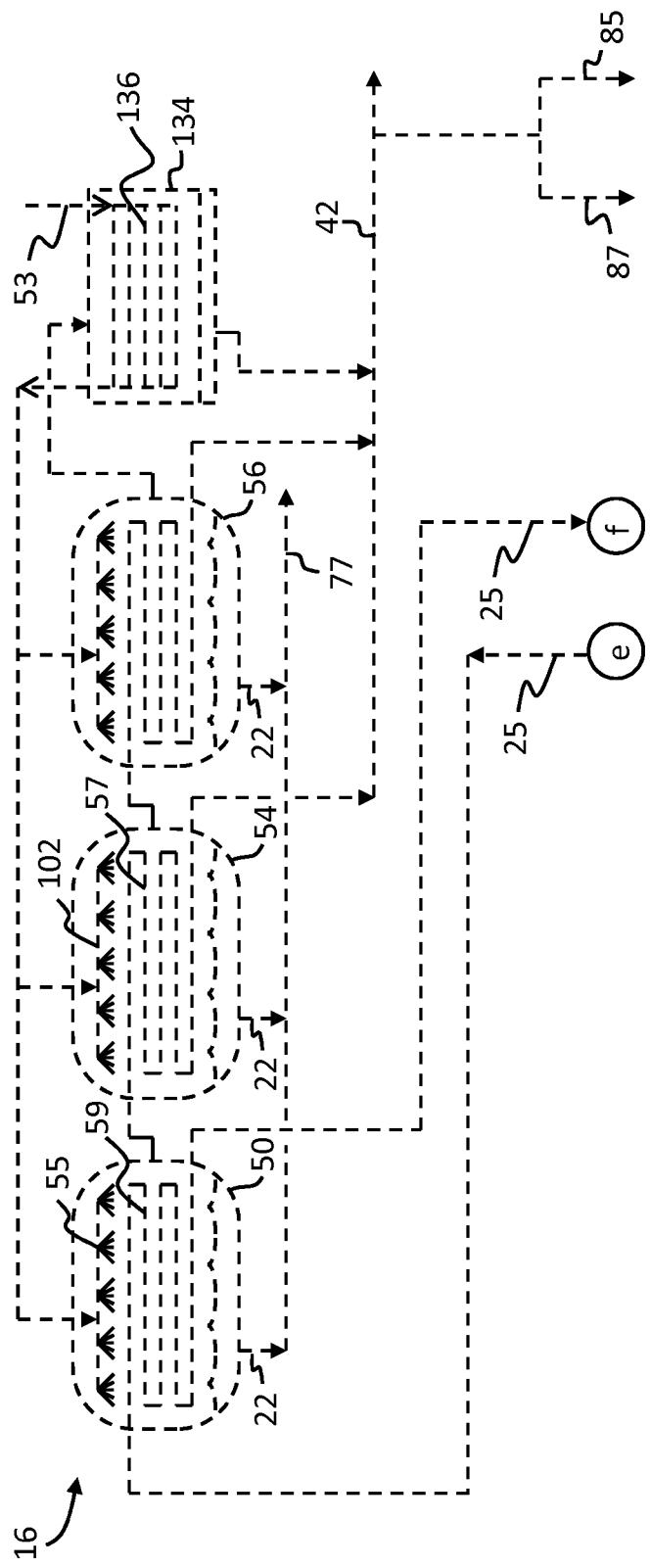

FIG. 3a and FIG. 3c illustrate an alternative integration of a reformate forming process with a multiple effect distillation process wherein the step of heating raw water by heat exchange with the reformate does not include heating of an intermediate working fluid.

Only differences between this embodiment and the earlier described embodiment will be described as the skilled person will readily understand the process flow diagrams of FIG. 3a and FIG. 3c from the diagrams themselves and the description of FIG. 1a and FIG. 1c. Like numerals designate like components in the drawings.

In the embodiment shown in FIG. 3a and FIG. 3c, the reformate 25 is passed to heat transfer coil 59 (instead of the working fluid steam) to indirectly heat the raw water 53 brought into contact with the exterior of the heat transfer coil 59. Reformate 25 that has been cooled in evaporator 50 is then passed to the heat exchanger 80.

When high export steam production is desired, the low level sensible heat in the combustion product gas 35 may be used to heat a portion of the make-up water and enhance the efficiency of the catalytic steam-hydrocarbon reforming process. A "steam-to-hydrogen ratio" may be defined as the ratio of the mass flow rate of export steam 150, $m_{steam}$, to the mass flow rate of hydrogen-containing product 105, $m_{H2}$, where the hydrogen-containing product is at least 95 mole % hydrogen. High export steam production is defined herein as $$13 \le \frac{m_{steam}}{m_{H_2}} \le 25.$$

Conventional catalytic steam-hydrocarbon reforming processes heat all of the make-up water by exchanging heat with reformate. The make-up water is heated from ambient temperature up to a temperature suitable for introducing the make-up water into a deaerator (e.g. 66° C. to 121° C.). For the case of high export steam production, the low level heat in the reformate is not sufficient to heat the make-up water to the required temperature for deaeration. Therefore, for the conventional catalytic-steam-hydrocarbon reforming process, the thermal efficiency deteriorates at steam-to-hydrogen ratios greater than about 13, since additional energy is required to heat the make-up water to the required temperature for deaeration.

For the case of medium export steam production (herein defined as $$7 \le \frac{m_{steam}}{m_{H_2}} \le 13),$$

the low level heat in the reformate is sufficient to heat all the make-up water; therefore, heating make-up water using the combustion product gas no longer improves the efficiency of hydrogen production. However, it saves the low level heat in the reformate, which can then be used as the heat source for thermal water purification. The reformate is a better heat source than the combustion product gas since it is under high pressure, can be easily piped to desired locations, and can be used directly to heat raw water.

In the case of low export steam production (herein defined as $$0 \le \frac{m_{steam}}{m_{H_2}} \le 7),$$

not all of the low level sensible heat in the combustion product gas can be removed by heating make-up water. The additional sensible heat is used as a heat source for a thermal water purification process. This is done by either through a working fluid (water/steam) or piping the raw water to the convection section to be heated by the combustion product gas. For steam-to-hydrogen ratios from 0 to 7, the amount of waste heat in the combustion product gas and/or reformate is generally great enough for a commercial scale thermal water purification unit or meet the production requirement of make-up water for the catalytic steam-hydrocarbon reforming process.

In the case of integration with at least one thermal water purification processes, the process may further comprise forming a steam product 150 for export from at least a portion of the boiler feed water stream 123 withdrawn from the deaerator 110 or forming no steam product, the steam product 150 exported from the process having a mass flow rate, $m_{steam}$, where $m_{steam}=0$ when no steam product is formed. The step of forming the hydrogen-containing product 105 may comprise separating at least a portion of the reformate 25 by pressure swing adsorption (e.g. in pressure swing adsorber 100) to produce the hydrogen-containing product 105 and a by-product gas 115, the hydrogen-containing gas comprising at least 95 mole % hydrogen, and the hydrogen containing product 105 having a mass flow rate, $m_{H_2}$. The process may be characterized in that the reformer feed gas mixture mass flow rate, the first water feed stream mass flow rate, the second water feed stream mass flow rate, the fuel mass flow rate, and the oxidant gas mass flow rate are selected such that $$0 \le \frac{m_{steam}}{m_{H_2}} \le 7.$$

EXAMPLES

The following examples are used to illustrate the benefits of the present process. Aspen Plus® by Aspen Technology, Inc. was used to simulate the processes described in the examples. Typical conditions for commercial catalytic steam-hydrocarbon reforming are used, such as natural gas feedstock, a steam-to-carbon ratio of 2.8, and a reformate temperature leaving the catalyst-containing tubes of 870° C. Each example includes a high temperature shift reactor and does not include a prereformer.

Example 1

The present process is simulated in example 1. In example 1, the export steam production is high, with a steam-to-hydrogen ratio of 17.3. Example 1 corresponds to the process flow diagram in FIG. 1a without integration with a thermal water purification process. Example 1 does not include heat exchanger 78, heat exchanger 46, or steam drum 220.

Example 1 does include heat exchanger 40 to make steam, heat exchanger 50 to heat boiler feed water from the deaerator, high temperature shift reactor 60, heat exchanger 70 to heat hydrocarbon feedstock 75, and heat exchanger 80 to heat make-up water stream 85.

Heat exchanger 80 is used to heat 59% of the make-up water needed by the process. Heat exchanger 80 heats the make-up water from 16 to 97° C., while cooling the reformate to 38° C.

Example 1 also includes heat exchanger 36 to preheat the reformer feed gas mixture 15, heat exchanger 37 to superheat the steam from steam drum 120, heat exchanger 38 to make steam, and heat exchanger 6 to heat make-up water stream 87.

Heat exchanger 6 is used to heat 41% of the make-up water needed by the process. Heat exchanger 6 heats the make-up water from 16° C. to 97° C., while cooling the combustion product gas to 58° C. All the heat recovered in heat exchanger 6 is recycled back to the catalytic steam-hydrocarbon reforming process thereby saving fuel needed for combustion in the combustion section of the reformer furnace. This provides about 2% savings in energy consumption. This energy savings offsets the capital cost associated with heat exchanger 6. In this example, the flue gas entering condenser 9 has been cooled to a low temperature (58° C.) without using a dedicated heat exchanger and a cooling utility to reject the sensible heat to the atmosphere. Therefore, recovering water from the flue gas can be conducted at a much lower cost.

Example 2

Comparative Case

A comparative case is simulated in example 2. In example 2, the export steam production is medium, with a steam-tohydrogen ratio of 12.5. Example 2 corresponds to the process flow diagram in FIG. 1a without integration with a thermal water purification process. Example 2 does not include heat exchanger 78, heat exchanger 46, steam drum 220, or heat exchanger 6 for heating make-up water.

Example 2 does include heat exchanger 40 to make steam, heat exchanger 50 to heat boiler feed water from the deaerator, high temperature shift reactor 60, heat exchanger 70 to heat hydrocarbon feedstock 75, and heat exchanger 80 to heat make-up water stream 85.

Heat exchanger 80 is used to heat 100% of the make-up water needed by the process. Heat exchanger 80 heats the make-up water from 16° C. to 97° C., while cooling the reformate to 38° C., indicating that the low level heat is used up for heating all of the make-up water. There is essentially no waste heat left in the reformate for thermal water purification.

Example 2 also includes heat exchanger 36 to preheat the reformer feed gas mixture 15, heat exchanger 37 to superheat the steam from steam drum 120, and heat exchanger 38 to make steam.

The combustion product gas is cooled to a conventional stack temperature of about 127° C.

Example 3

A process according to the present process is simulated in example 3. In example 3, the export steam production is medium, with a steam-to-hydrogen ratio of 12.5, the same as for Example 2. Example 3 corresponds to the process flow diagram in FIG. 1a without integration with a thermal water purification process. Example 3 does not include heat exchanger 78, heat exchanger 46, or steam drum 220.

Example 3 does include heat exchanger 40 to make steam, heat exchanger 50 to heat boiler feed water from the deaerator, high temperature shift reactor 60, heat exchanger 70 to heat hydrocarbon feedstock 75, and heat exchanger 80 to heat make-up water stream 85.

Heat exchanger 80 is used to heat 34% of the make-up water needed by the process. Heat exchanger 80 heats the make-up water from 16° C. to 97° C., while cooling the reformate to 102° C.

Example 3 also includes heat exchanger 36 to preheat the reformer feed gas mixture 15, heat exchanger 37 to superheat the steam from steam drum 120, heat exchanger 38 to make steam, and heat exchanger 6 to heat make-up water stream 87.

Heat exchanger 6 is used to heat 66% of the make-up water needed by the process. Heat exchanger 6 heats the make-up water from 16 to 97° C., while cooling the combustion product gas to 54° C. For the given export steam production, this heat recovery has no impact on the thermal efficiency of the process. However, heating a portion of the make-up water using heat exchanger 6 increases the temperature of the reformate leaving heat exchanger 80 from 38° C. in example 2, to 102° C. in example 3. The combustion product gas is cooled to 54° C. in example 3 compared to 127° C. in example 2.

This shift of low level heat from the combustion product gas to the reformate makes it possible to use the waste heat in the reformate for thermal water purification.

Furthermore, the size of heat exchanger 80 is reduced by 80% since it is only required to heat 34% of the make-up water. The total equipment cost of heat exchanger 6 and heat exchanger 80 in example 3 is estimated to be about the same as heat exchanger 80 in example 2.

Examples 2 and 3 show that the current process not only facilitates water recovery from combustion product gas by cooling the combustion product gas in heat exchanger 6, but also covers the cost of heat exchanger 6 by reducing the size of heat exchanger 80 for heating make-up water by reformate. The present process provides the added benefit of providing availability of low level heat in the reformate stream for thermal water purification.

We claim:

1. A process for producing a hydrogen-containing product and one or more liquid water products, the process comprising:
   (a) introducing a reformer feed gas mixture into a plurality of catalyst-containing reformer tubes in a reformer furnace, reacting the reformer feed gas mixture in a reforming reaction under reaction conditions effective to form a reformate comprising $H_2$, CO, $CH_4$, and $H_2O$, and withdrawing the reformate from the plurality of catalyst-containing tubes;
   (b) combusting a fuel with an oxidant gas in a combustion section of the reformer furnace external to the plurality of catalyst-containing reformer tubes under conditions effective to combust the fuel to form a combustion product gas and generate heat to supply energy for reacting the reformer feed gas mixture inside the plurality of catalyst-containing reformer tubes, and withdrawing the combustion product gas from the combustion section, wherein the plurality of catalyst containing reformer tubes are contained in the combustion section of the reformer furnace;
   (c) heating a first water feed stream by indirect heat transfer with the combustion product gas thereby cooling the combustion product gas;
   (d) heating a second water feed stream by indirect heat transfer with the reformate withdrawn from the plurality of catalyst-containing tubes, thereby cooling the reformate;
   (e) passing the first water feed stream and the second water feed stream to a deaerator, the first water feed stream being passed to the deaerator after being heated by the combustion product gas, the second water feed stream being passed to the deaerator after being heated by the reformate, stripping dissolved gases from the first water feed stream and from the second water feed stream in the deaerator, withdrawing a vent stream from the deaerator, the vent stream comprising steam and gases formed from the dissolved gases stripped from the first water feed stream and from the second water feed stream, and withdrawing a boiler feed water stream from the deaerator, the boiler feed water stream comprising at least a portion of the first water feed stream and at least a portion of the second water feed stream;
   (f) introducing the combustion product gas into a condenser after the combustion product gas has been cooled by the first water feed stream, cooling the combustion product gas in the condenser by indirect heat transfer with a cooling fluid thereby condensing water from the combustion product gas to form a liquid water stream, separating the liquid water stream from a water-depleted combustion product gas stream, withdrawing the liquid water stream from the condenser, and withdrawing the water-depleted combustion product gas stream from the condenser; and
   (g) forming the hydrogen-containing product from the reformate after the reformate has heated the second water feed stream;
   (h) wherein the one or more liquid water products comprise the liquid water stream withdrawn from the condenser.

2. The process of claim 1 wherein the reformate is separated into a second liquid water stream and a water-depleted reformate portion after the reformate was cooled by the second water feed stream, wherein the one or more liquid water products further comprise the second liquid water stream.

3. The process of claim 2 wherein at least one of the first water feed stream and the second water feed stream comprises at least a portion of the second liquid water stream.

4. The process of claim 1 wherein the step of forming the hydrogen-containing product comprises separating at least a portion of the reformate by pressure swing adsorption to produce the hydrogen-containing product and a by-product gas.

5. The process of claim 4 wherein the fuel comprises the by-product gas and a supplemental fuel.

6. The process of claim 5 further comprising introducing a hydrocarbon feedstock into a hydrodesulphurization unit to remove sulfur from the hydrocarbon feedstock, and forming the supplemental fuel from at least a portion of the hydrocarbon feedstock obtained from the hydrodesulphurization unit.

7. The process of claim 1 further comprising:
heating raw water by indirect heat transfer with the reformate from step (a) thereby heating the raw water for purification thereof by a thermal water purification process to produce purified water, and thereby cooling the reformate, wherein the reformate is cooled to heat the raw water before or after the reformate is cooled to heat the second water feed stream;
wherein the one or more liquid water products further comprise the purified water.

8. The process of claim 7 wherein the step of heating raw water by indirect heat transfer with the reformate comprises:
heating a working fluid by indirect heat transfer with the reformate from step (a), and heating the raw water by indirect heat transfer with the working fluid.

9. The process of claim 8 wherein the working fluid is water, wherein the working fluid water is evaporated to form a stream of steam having a pressure ranging from 15.2 kPa to 304 kPa (absolute) when heated by the reformate from step (a), and wherein at least a portion of the stream of steam is condensed when heating the raw water.

10. The process of claim 7 wherein the raw water comprises at least one of salt water, river water, stream water, lake water, municipal recycled water, industrial recycled water, and groundwater.

11. The process of claim 7 wherein the thermal water purification process is one of a multiple effect distillation process and a multi-stage flash process.

12. The process of claim 7 further comprising:
forming a steam product from at least a portion of the boiler feed water stream withdrawn from the deaerator or forming no steam product;
wherein the step of forming the hydrogen-containing product comprises separating at least a portion of the reformate by pressure swing adsorption to produce the hydrogen-containing product and a by-product gas;
wherein the hydrogen-containing product has a mass flow rate, $m_{H_2}$, the steam product exported from the process has a mass flow rate, $m_{steam}$, where $m_{steam}=0$ when no steam product is formed, the reformer feed gas mixture has a reformer feed gas mixture mass flow rate, the first water feed stream has a first feed water feed stream mass flow rate, the second water feed stream has a second water feed stream mass flow rate, the fuel has a fuel mass flow rate, and the oxidant gas has an oxidant gas mass flow rate; and
wherein the reformer feed gas mixture mass flow rate, the first water feed stream mass flow rate, the second water feed stream mass flow rate, the fuel mass flow rate, and the oxidant gas mass flow rate are selected such that $$0 \le \frac{m_{steam}}{m_{H_2}} \le 13.$$

wherein the hydrogen-containing product is at least 95 mole % hydrogen.

13. The process of claim 1 further comprising:
heating raw water by indirect heat transfer with the combustion product gas from step (b) thereby heating the raw water for purification thereof by a thermal water purification process to produce purified water, and thereby cooling the combustion products gas, wherein the combustion product gas is cooled to heat the raw water before the combustion product gas is cooled to heat the first water feed stream;
wherein the one or more liquid water products comprise the purified water.

14. The process of claim 13 wherein the step of heating raw water by indirect heat transfer with the combustion product gas comprises:
heating a working fluid by indirect heat transfer with the combustion product gas from step (b), and heating the raw water by indirect heat transfer with the working fluid.

15. The process of claim 14 wherein the working fluid is water, wherein the working fluid water is evaporated to form a stream of steam having a pressure ranging from 15.2 kPa to 304 kPa (absolute) when heated by the combustion product gas from step (b), and wherein at least a portion of the stream of steam is condensed when heating the raw water.

16. The process of claim 13 wherein the raw water comprises at least one of salt water, river water, stream water, lake water, municipal recycled water, industrial recycled water, and groundwater.

17. The process of claim 13 wherein the thermal water purification process is one of a multiple effect distillation process and a multi-stage flash process.

18. The process of claim 13 further comprising:
forming a steam product from at least a portion of the boiler feed water stream withdrawn from the deaerator or forming no steam product;
wherein the step of forming the hydrogen-containing product comprises separating at least a portion of the reformate by pressure swing adsorption to produce the hydrogen-containing product and a by-product gas;
wherein the hydrogen-containing product has a mass flow rate, $m_{H_2}$, the steam product exported from the process has a mass flow rate, $m_{steam}$, where $m_{steam}=0$ when no steam product is formed, the reformer feed gas mixture has a reformer feed gas mixture mass flow rate, the first water feed stream has a first feed water feed stream mass flow rate, the second water feed stream has a second water feed stream mass flow rate, the fuel has a fuel mass flow rate, and the oxidant gas has an oxidant gas mass flow rate; and
wherein the reformer feed gas mixture mass flow rate, the first water feed stream mass flow rate, the second water feed stream mass flow rate, the fuel mass flow rate, and the oxidant gas mass flow rate are selected such that $$0 \le \frac{m_{steam}}{m_{H_2}} \le 7.$$

19. The process of claim 1 wherein at least one of the first water feed stream and the second water feed stream comprises at least a portion of the liquid water stream.

* * * * *